United States Patent
Boston (10) Patent No.: US 12,077,086 B2
(45) Date of Patent: Sep. 3, 2024

(54) VEHICLE ACCESS RAMP

(71) Applicant: MaxVan, LLC, Tucker, GA (US)

(72) Inventor: Jordan Robert Boston, Roswell, GA (US)

(73) Assignee: MAX VAN, LLC, Tucker, GA (US)

( * ) Notice: Subject to any disclaimer, the term of this patent is extended or adjusted under 35 U.S.C. 154(b) by 0 days.

(21) Appl. No.: 17/137,923

(22) Filed: Dec. 30, 2020

(65) Prior Publication Data

US 2021/0331615 A1 Oct. 28, 2021

Related U.S. Application Data

(60) Provisional application No. 62/955,819, filed on Dec. 31, 2019.

(51) Int. Cl.
*B60P 1/43* (2006.01)
*A61G 3/06* (2006.01)

(52) U.S. Cl.
CPC .............. *B60P 1/433* (2013.01); *A61G 3/061* (2013.01)

(58) Field of Classification Search
CPC ................................. B60P 1/433; A61G 3/061
See application file for complete search history.

(56) References Cited

U.S. PATENT DOCUMENTS

| | | | | |
|---|---|---|---|---|
| 2,248,080 A | * | 7/1941 | Hathaway | B62D 53/067 280/80.1 |
| 2,318,802 A | * | 5/1943 | Reid | B62D 53/062 280/80.1 |
| 2,900,094 A | * | 8/1959 | Ferguson | B60P 1/43 414/537 |
| 3,651,965 A | | 3/1972 | Simonelli et al. | |
| 4,664,584 A | | 5/1987 | Braun et al. | |
| 5,490,754 A | * | 2/1996 | Voelzke | B60P 1/433 14/71.7 |
| 6,698,998 B2 | | 3/2004 | Koretsky | |
| 6,729,829 B2 | | 5/2004 | Zimmer | |
| 7,547,178 B1 | * | 6/2009 | Dierks | B60P 1/43 414/484 |
| 7,658,587 B1 | * | 2/2010 | Dierks | B60P 3/066 414/484 |

(Continued)

FOREIGN PATENT DOCUMENTS

| CA | 2926417 C | 9/2016 |
|---|---|---|
| CN | 106740372 A | 5/2017 |

(Continued)

OTHER PUBLICATIONS

Mobilityworks; Foldout ramp; Accessed Jul. 22, 2019; downloaded from https://www.mobilityworks.com/getting-started/wheelchair-vans/.

(Continued)

*Primary Examiner* — Saul Rodriguez
*Assistant Examiner* — Ashley K Romano
(74) *Attorney, Agent, or Firm* — Jason A. Bernstein; Barnes & Thornburg LLP (57) ABSTRACT

A vehicle access ramp includes a base section and a fold-out section. The base section is mounted to a vehicle and the fold-out section is mounted to the base section. The fold-out section is movable from a use position allowing access into or out of the vehicle using the vehicle access ramp to a storage position allowing movement of the vehicle.

16 Claims, 5 Drawing Sheets

(56) References Cited

U.S. PATENT DOCUMENTS

| | | | |
|---|---|---|---|
| 9,315,138 B1* | 4/2016 | Dierks | B60P 1/433 |
| 9,820,899 B1* | 11/2017 | Morris | A61G 3/067 |
| 10,118,777 B1* | 11/2018 | Tower | B65G 69/30 |
| 10,272,816 B1* | 4/2019 | Watkins | B60P 1/433 |
| 10,486,577 B1* | 11/2019 | Geraets | B60P 1/433 |
| 10,994,795 B1* | 5/2021 | Perez | A61G 3/061 |
| 2008/0184500 A1 | 8/2008 | Bettcher | |
| 2011/0008140 A1* | 1/2011 | Hansen | A61G 3/067 |
| | | | 414/812 |
| 2011/0268544 A1* | 11/2011 | Koretsky | A61G 3/067 |
| | | | 414/813 |
| 2016/0096464 A1* | 4/2016 | Robertson | B62D 53/062 |
| | | | 414/480 |
| 2016/0242975 A1* | 8/2016 | Kitchin | A61G 3/066 |
| 2017/0282774 A1* | 10/2017 | Schepmann | B60R 3/00 |
| 2018/0093602 A1* | 4/2018 | Selzer | B60P 1/433 |
| 2018/0272913 A1* | 9/2018 | Marcum | B60P 1/433 |
| 2018/0354401 A1* | 12/2018 | Johnson | B60P 1/435 |
| 2019/0193620 A1* | 6/2019 | Matsuoka | B60P 1/433 |
| 2019/0291628 A1* | 9/2019 | Cerocchi | B60P 3/08 |
| 2020/0129350 A1* | 4/2020 | Collett | B60P 1/433 |
| 2020/0290495 A1* | 9/2020 | Behnke | B60P 1/24 |
| 2021/0086681 A1* | 3/2021 | Green | A01K 1/0035 |

FOREIGN PATENT DOCUMENTS

| | | |
|---|---|---|
| DE | 202004017938 U1 | 2/2005 |
| EP | 1913916 A2 | 4/2008 |
| KR | 20130058326 A | 6/2013 |

OTHER PUBLICATIONS

Silver Cross Automotive; VMI full floor side entry vans; Accessed prior to Jul. 22, 2019; downloaded from https://silvercrossauto.com/wheelchair-vehicles/side-entry-wheelchair-minivans/.

* cited by examiner

VEHICLE ACCESS RAMP

PRIORITY CLAIM

This application claims priority under 35 U.S.C. § 119(e) to U.S. Provisional Application Ser. No. 62/955,819, filed Dec. 31, 2019, the disclosure of which is expressly incorporated by reference herein in its entirety.

FIELD

The present disclosure relates to access ramps, and particularly to access ramps for vehicles. More particularly, the present disclosure relates to a fold-out access ramp for a vehicle.

BACKGROUND

Wheelchair ramps for vehicles are known in the art and are used to facilitate disabled individuals to enter and exit a vehicle in a wheelchair, while enabling the ramp to be stored in the vehicle while not in use. Existing side-entry designs have the ramp extend out the side door perpendicular to the vehicle side. This configuration typically requires the door to be modified to open several inches wider (typically 3-5 inches) than normal. It would be desirable to have a side-entry ramp which can be installed in a vehicle conversion without having to modify the door to open much wider (about 1 inch) than the door was designed to open. It would also be desirable to have a ramp system which can be used as a floor as well as a ramp.

SUMMARY

According to illustrative embodiments of the present disclosure, a vehicle access ramp includes a base section and a fold-out section. The base section is mounted to a vehicle and the fold-out section is mounted to the base section. The fold-out section is movable from a use position allowing access into or out of the vehicle using the vehicle access ramp to a storage position blocking travel along the fold-out section and allowing movement of the vehicle.

In illustrative embodiments, the base section includes a frame and a deck panel coupled to the frame. The deck panel is movable from a raised position to a lowered position. The deck panel is substantially aligned with the vehicle floor in the raised position and configured to form part of a usable area of the vehicle floor. The deck panel moves to the lowered position and substantially aligns with the fold-out section in the use position to allow access into or out of the vehicle along the vehicle access ramp.

In illustrative embodiments, a drive mechanism is coupled to the frame and configured to move the deck panel between the raised and lowered positions. The drive mechanism supports the deck panel in the raised position to allow the deck panel to be loaded as part of the usable area of the vehicle floor.

In illustrative embodiments, the drive mechanism includes a drive unit, an axle, and one or more lifters coupled to the axle. The lifters are coupled to the axle to rotate with the axle. The drive unit rotates the axle and attached lifters to move the deck panel between the raised and lowered positions. The lifters are arranged substantially vertical with the deck panel in the raised position. The lifters are arranged substantially parallel to the deck panel with the deck panel in the lowered position.

BRIEF DESCRIPTION OF THE DRAWINGS

The drawings disclose exemplary embodiments in which like reference characters designate the same or similar parts throughout the figures of which.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The foregoing terms as well as other terms should be broadly interpreted throughout this application to include all known as well as all hereafter discovered versions, equivalents, variations and other forms. The present disclosure is intended to be broadly interpreted and not limited.

Figure 1:
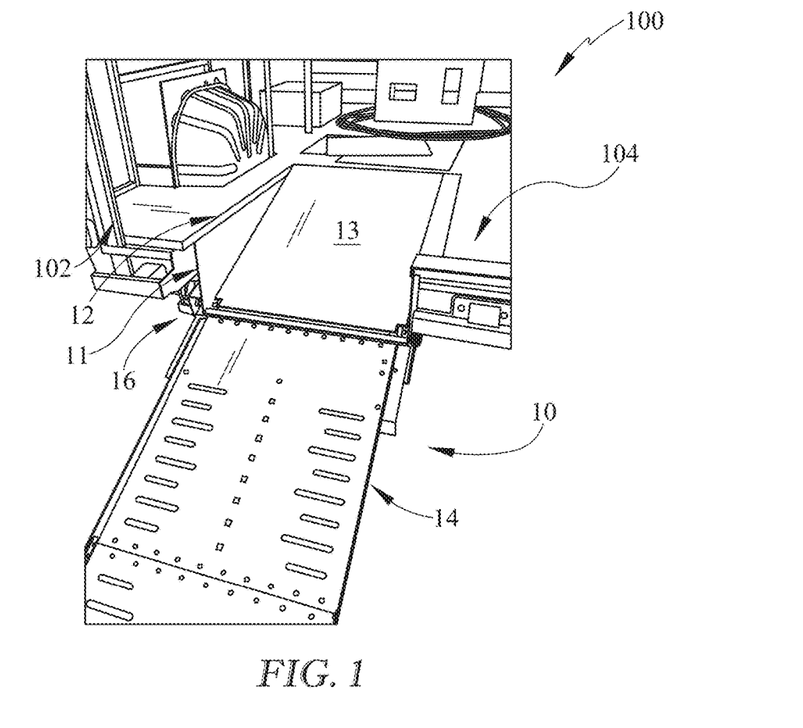
FIG. 1 is a rear perspective view of a vehicle having a vehicle access ramp in accordance with the present disclosure showing a deck panel of the vehicle access ramp in a lowered position to allow access into or out of the vehicle.
Figure 2:
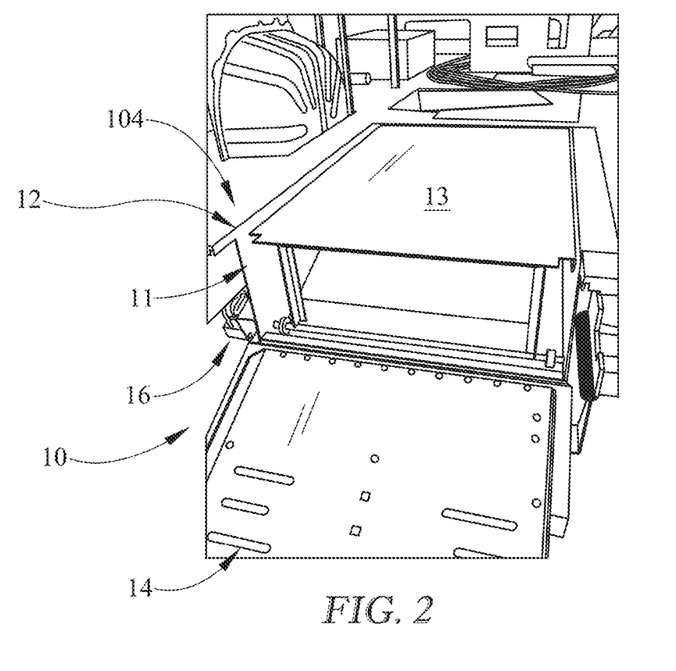
FIG. 2 is a view similar to FIG. 1 showing the deck panel in a raised position forming a usable area of a vehicle floor.

A vehicle access ramp 10 in accordance with one embodiment of the present disclosure is illustratively mounted on a vehicle 100 as shown in FIGS. 1 and 2. The vehicle access ramp 10 includes a base section 12 mounted to the vehicle 100 and a fold-out section 14 mounted to the base section 12. The vehicle access ramp 10 allows access into and out of the vehicle 100 through an opening 102, such as a rear opening, of the vehicle 100. The vehicle access ramp 10 is also configured to form part of a usable area of a floor 104 of the vehicle 100.

The base section 12 includes a frame 11 and a movable deck panel 13 coupled to the frame 11 as shown in FIGS. 1 and 2. The frame 11 is mounted adjacent to the opening 102 and extends into the floor 104 of the vehicle 100. The deck panel 13 is movable to a lowered position (shown in FIG. 1) substantially aligned with the fold-out section 14 in a use position allowing access into or out of the vehicle 100 through the opening 102 along the vehicle access ramp 10. The deck panel 13 is also movable to a raised position (shown in FIG. 2) to form part of the usable area of the floor 104, such as to support a passenger of the vehicle 100. In the illustrative embodiment, a drive mechanism 16 is coupled to the frame 11 and configured to move the deck panel 13 between the raised and lowered positions. The drive mechanism 16 also supports the deck panel 13 in the raised position to allow the deck panel 13 to be loaded as part of the usable area of the floor 104 of the vehicle 100. The fold-out section 14 is movable to a storage position (shown in FIG. 7) allowing a door or other closure to cover the opening 102 and allow movement of the vehicle 100. The travel along the fold-out section 14 is blocked in the storage position.

Figure 3:
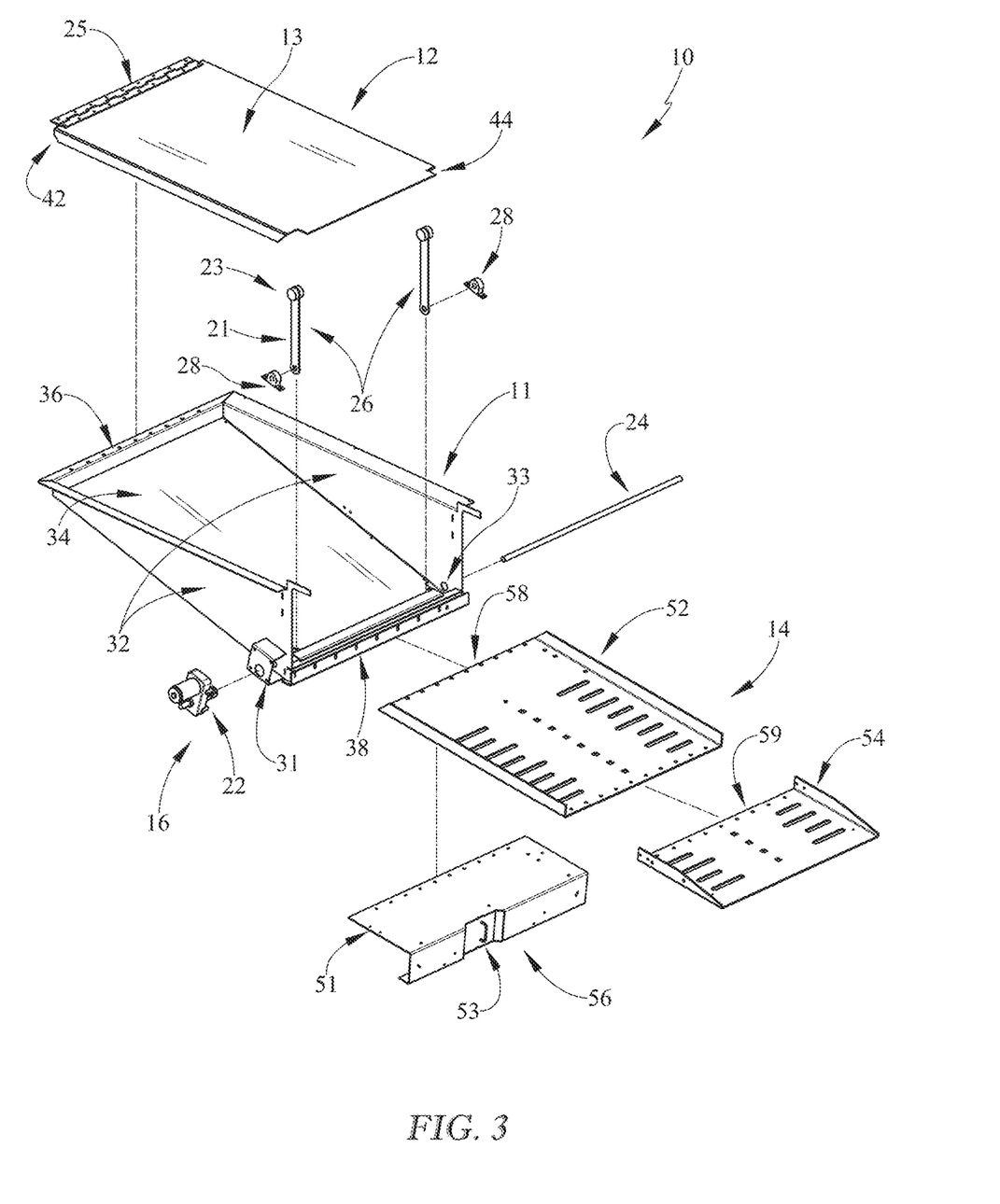
FIG. 3 is a perspective exploded assembly view of the vehicle access ramp of FIG. 1.
Figure 5:
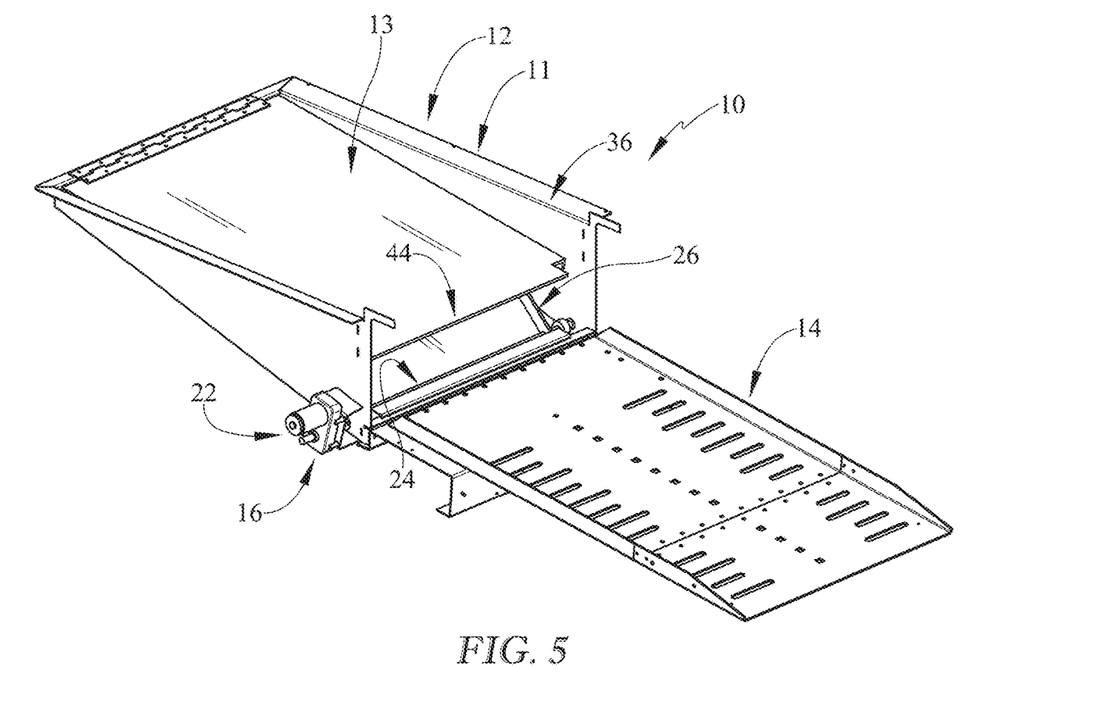
FIG. 5 is a view similar to FIG. 4 showing a drive mechanism moving the deck panel from the lowered position toward the raised position.
Figure 6:
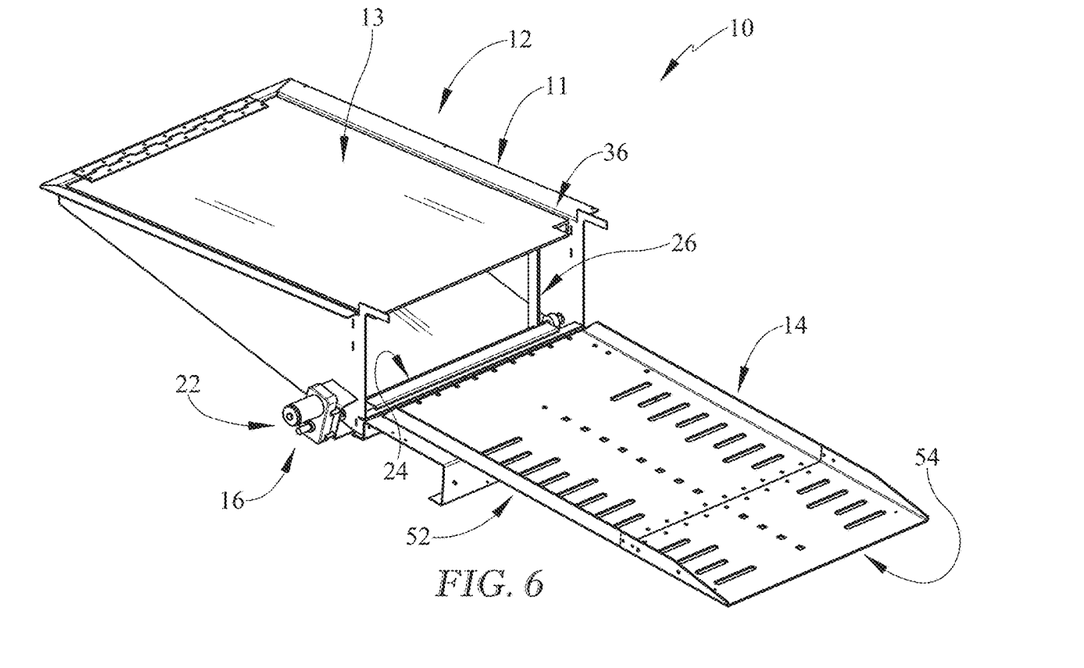
FIG. 6 is a view similar to FIG. 5 showing the deck panel in the raised position and the lifters arranged to support the deck panel.
Figure 8:
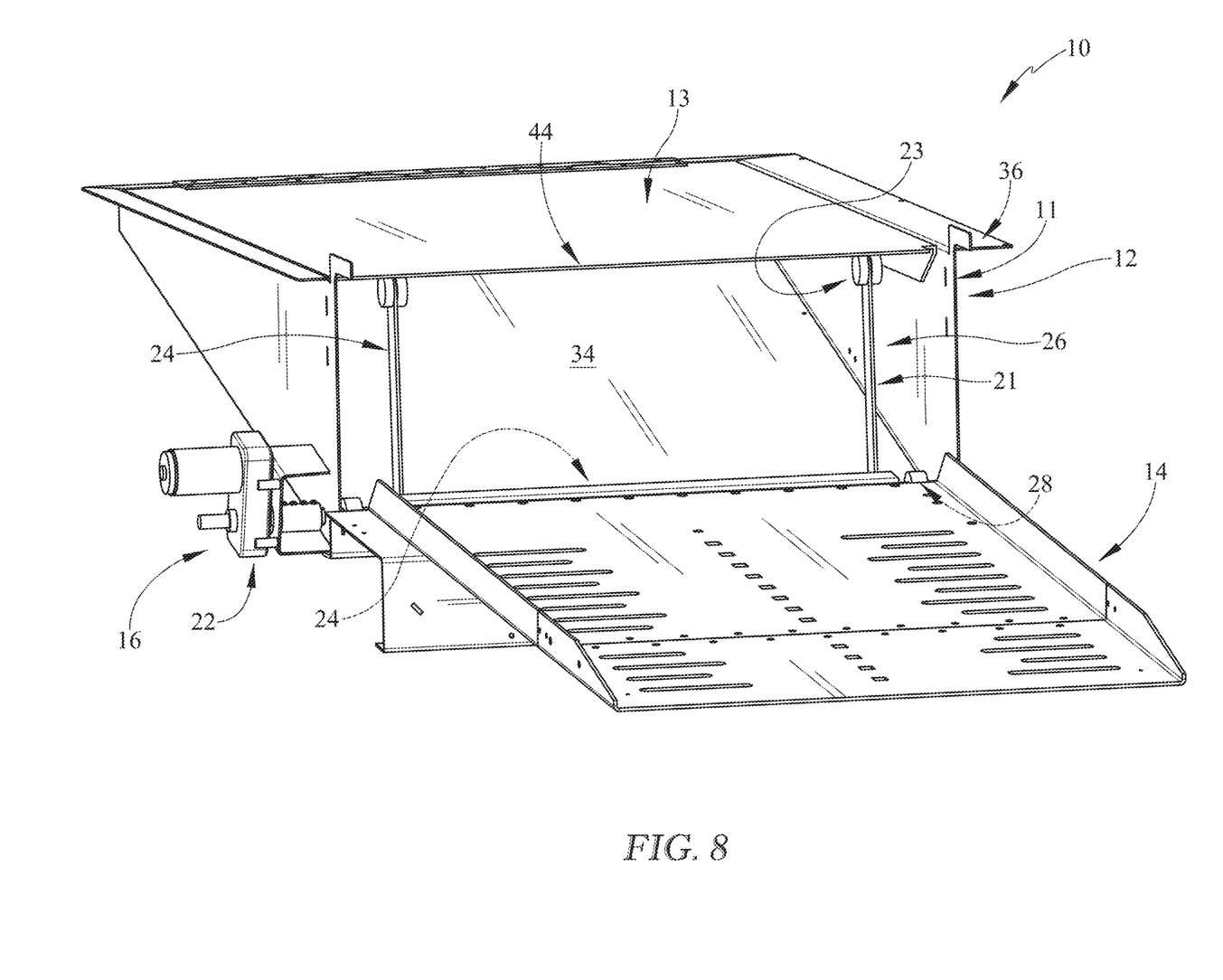
FIG. 8 is a perspective view of the vehicle access ramp of FIG. 1 showing that the lifters include an arm and a roller coupled to a distal end of the arm.

The drive mechanism 16 illustratively includes a drive unit 22 (such as an electric motor with attached reduction gearing), an axle 24, and one or more lifters 26 coupled to the axle 24, as shown in FIG. 3. The lifters 26 are coupled to the axle 24 to rotate with the axle 24. In some embodiments, the lifters 26 are welded to the axle 24. In some embodiments, the lifters 26 are keyed to the axle 24. The drive unit 22 rotates the axle 24, and the lifters 26 engage with an underside of the deck panel 13 to move the deck panel 13 between the raised and lowered positions as suggested in FIGS. 4-6. In some embodiments, bearings 28 are coupled to the frame 11 to support the axle 24 for rotation. The lifters 26 are arranged substantially vertical with the deck panel 13 in the raised position, as shown in FIGS. 6 and 8, to support loads placed on the deck panel 13. The lifters 26 are arranged substantially parallel to the deck panel 13 with the deck panel 13 in the lowered position, as suggested in FIG. 4.

Each lifter 26 includes an arm 21 and a roller 23 as shown in FIG. 3. A proximal end of each arm 21 is coupled to the axle 24, and the roller 23 is coupled to a distal end of the arm 21. The rollers 23 allow smooth, sliding movement of the lifters 26 along the deck panel 13 during movement between the raised and lowered positions as suggested in FIG. 8.

The frame 11 includes spaced apart perimeter walls 32 extending around a bottom wall 34 as shown in FIG. 3. The perimeter walls 32 define an upper rim 36 and a lower rail 38. The lower rail 38 is vertically spaced apart from the upper rim 36, and the bottom wall 34 is arranged at an angle relative to the upper rim 36 to extend from adjacent the upper rim 36 to adjacent the bottom rail 38. The upper rim 36 is substantially aligned with the floor 104 vehicle 100 with the frame 11 mounted on the vehicle 100 as suggested in FIGS. 1 and 2. In the illustrative embodiment, a platform 31 extends from one of the perimeter walls 32 for mounting of the drive unit on 22 on the frame 11. In some embodiments, one or more holes 33 can be formed through the frame 11 for assembly of the axle 24 onto the frame 11.

Figure 4:
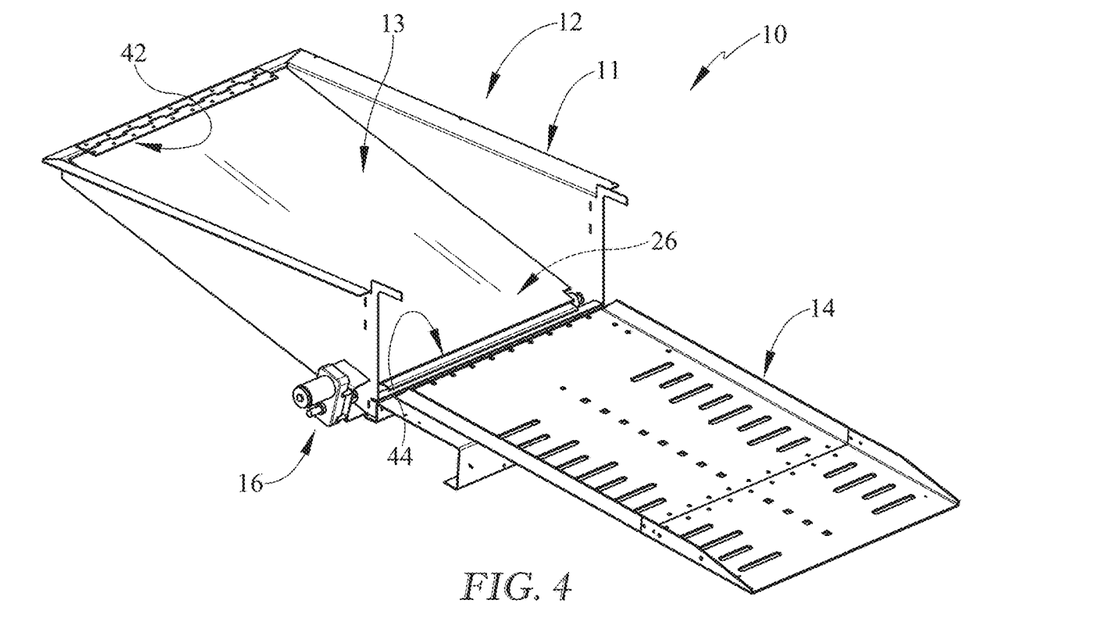
FIG. 4 is a perspective view of the vehicle access ramp of FIG. 1 showing a fold-out section in a use position and the deck panel in the lowered position.

In one illustrative embodiment the deck panel 13 extends between a front edge 42 and a rear edge 44, as shown in FIG. 3. In this embodiment, a hinge 25 (such as a piano style hinge) is coupled between the deck panel 13 and the upper rim 36 of the frame 11. The hinge 25 allows pivoting movement of the deck panel 13 relative to the frame 11. In the lowered position, the rear edge 44 of the deck panel 13 is arranged adjacent to the lower rail 38 and fold-out section 14 as shown in FIG. 4. The lifters 26 along the bottom wall 34 toward the front edge 42 of the deck panel 13 and are arranged substantially parallel to the deck panel 13 with the deck panel 13 in the lowered position. The drive unit 22 of the drive mechanism 16 rotates the lifters 26 to move the deck panel 13 from the lowered position to the raised position as suggested in FIGS. 4-6. In the raised position, the deck panel 13 is substantially horizontal, substantially parallel to the upper rim 36 of the frame 11, as shown in FIG. 6, and/or substantially parallel to the floor 104 of the vehicle 100, as shown in FIG. 2. The rollers 23 are positioned adjacent to the rear edge 44 of the deck panel 13 and the lifters 26 are arranged substantially vertical and/or perpendicular to the deck panel 13 with the deck panel 13 in the raised position as shown in FIGS. 6 and 8.

In one illustrative embodiment, the fold-out section 14 includes a first ramp portion 52 coupled to the frame 11 and a second ramp portion 54 coupled to the first ramp portion 52 as shown in FIG. 3. A hinge 58 couples the first ramp portion 52 to the lower rail 38 of the frame 11 and allows pivoting movement of the first ramp portion 52 relative to the frame 11. A hinge 59 couples the second ramp portion 54 to the first ramp portion 52 and allows pivoting movement of the second ramp portion 54 relative to the first ramp portion 52.

The fold-out section 14 is movable to a use position (shown in FIG. 6) with the first and second ramp portions 52, 52 aligned with one another and extending away from the frame 11. The second ramp portion 54 is configured to engage with ground beneath the vehicle 100 and allow a user to travel along the vehicle access ramp 10 into the vehicle 100. The fold-out section 14 is also movable to a storage position (shown in FIG. 7) with the first ramp portion 52 folded relative to the frame 11 and the second ramp portion 54 folded relative to the first ramp portion 52. The two-portion fold-out section 14 can allow for greater visibility through a rear window of the vehicle 100 the storage position, but the fold-out section 14 can include more or less ramp portions without departing from the present disclosure.

Figure 7:
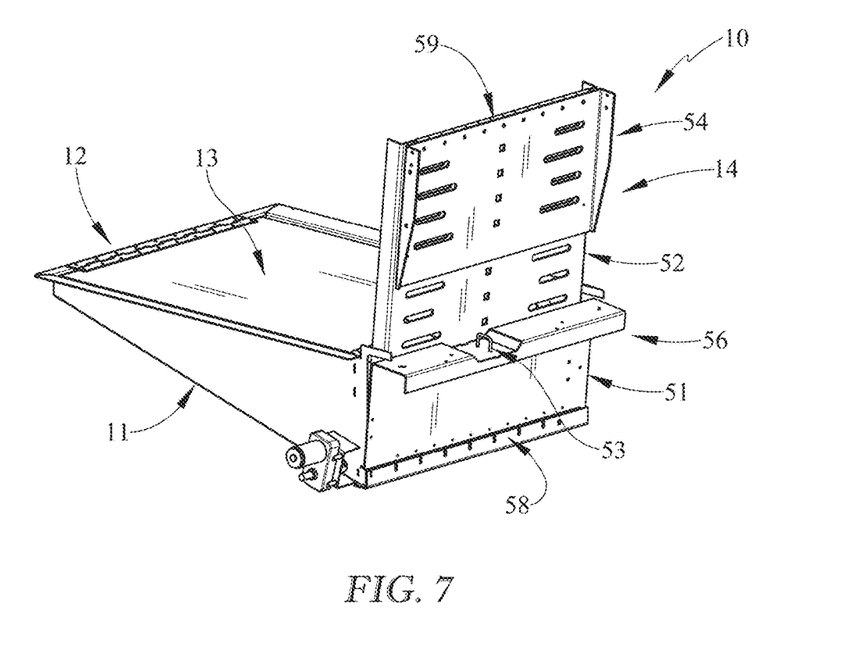
FIG. 7 is a view similar to FIG. 6 showing the fold-out section in the storage position.

In some embodiments, a rear support 56 is coupled to the fold-out section 14 and includes a bumper holder 51 and an anchor 53 coupled to the bumper holder as shown in FIGS. 3 and 7. The bumper holder 51 is configured to hold a portion of a rear bumper of the vehicle 100 that substantially aligns with the rest of the rear bumper when the fold-out section 14 is in the storage position. The anchor 53 is configured to engage with a catch of a door of the vehicle 100 to hold the door closed over the opening 102.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A vehicle access ramp, comprising:
   (a) a base section including a frame arranged to be mounted on a vehicle and a deck panel coupled to the frame, the deck panel extending between a front edge and an opposite rear edge, the front edge coupled to the frame to allow the deck panel to pivot relative to the frame between a raised position and a lowered position; and
   (b) a fold-out section coupled to the frame of the base section, the fold-out section movable relative to the frame between a use position extending away from the frame to allow a user to travel along the fold-out section and a storage position blocking travel along the fold-out section,
   wherein, with the fold-out section in the use position, the deck panel is movable relative to the frame between the raised position where the deck panel is arranged substantially horizontal and the rear edge is spaced apart from the fold-out section and the lowered position where the rear edge of the deck panel is substantially aligned with the fold-out section.

2. The vehicle access ramp of claim 1, further comprising a drive mechanism coupled to the frame and configured to move the deck panel between the raised and lowered positions.

3. The vehicle access ramp of claim 2, wherein the drive mechanism supports the deck panel in the raised position to allow the deck panel to be loaded.

4. The vehicle access ramp of claim 2, wherein the drive mechanism includes a drive unit, an axle coupled to the drive unit for rotation by the drive unit, and a lifter coupled to the axle for rotation with the axle, and wherein the lifter engages the deck panel with rotation of the axle to move the deck panel between the raised and lowered positions.

5. The vehicle access ramp of claim 4, wherein the lifter is arranged substantially perpendicular to the deck panel in the raised position, and wherein the lifter is arranged substantially parallel to the deck panel in the lowered position.

6. A vehicle, comprising:
   (a) a floor;
   (b) an opening into the vehicle; and
   (c) a vehicle access ramp coupled to the floor adjacent to the opening, the vehicle access ramp comprising:
      (1) a base section including a frame mounted on the vehicle and a deck panel coupled to the frame, the deck panel extending between a front edge and an opposite rear edge, the front edge coupled to the frame to allow the deck panel to pivot relative to the frame between a raised position and a lowered position; and,
      (2) a fold-out section coupled to the frame of the base section, the fold-out section movable relative to the frame between a use position extending away from the frame to allow a user to travel along the fold-out section and a storage position blocking travel along the fold-out section,
   wherein, with the fold-out section in the use position, the deck panel is movable relative to the frame between the raised position where the deck panel is substantially aligned with the floor to form a usable part of the floor and the rear edge is spaced apart from the fold-out section and the lowered position where the rear edge of the deck panel is substantially aligned with the fold-out section to allow access into or out of the vehicle through the opening along the vehicle access ramp.

7. The vehicle of claim 6, further comprising a drive mechanism coupled to the frame and configured to move the deck panel between the raised and lowered positions.

8. The vehicle of claim 7, wherein the drive mechanism supports the deck panel in the raised position to allow the deck panel to be loaded as a usable part of the floor.

9. The vehicle of claim 7, wherein the drive mechanism includes a drive unit, an axle coupled to the drive unit for rotation by the drive unit, and a lifter coupled to the axle for rotation with the axle, and wherein the lifter engages the deck panel with rotation of the axle to move the deck panel between the raised and lowered positions.

10. The vehicle of claim 9, wherein the lifter is arranged substantially perpendicular to the deck panel in the raised position, and wherein the lifter is arranged substantially parallel to the deck panel in the lowered position.

11. A vehicle access ramp, comprising:
    (a) a base section including:
       (1) a frame arranged to be mounted on a vehicle, the frame having spaced apart perimeter walls coupled to a bottom wall, the perimeter walls defining an upper rim spaced apart from the bottom wall; and
       (2) a deck panel coupled to the upper rim of the frame, the deck panel extending between a front edge and an opposite rear edge, the front edge coupled to the frame to allow the deck panel to pivot relative to the frame between a raised position and a lowered position; and
    (b) a fold-out section coupled to the frame of the base section, the fold-out section movable relative to the frame between a use position extending away from the frame to allow a user to travel along the fold-out section and a storage position blocking travel along the fold-out section,
    wherein, with the fold-out section in the use position, the deck panel is movable between relative to the frame the raised position where the deck panel is substantially parallel to the upper rim of the frame and the rear edge is spaced apart from the fold-out section and the lowered position where the rear edge of the deck panel is substantially aligned with the fold-out section.

12. The vehicle access ramp of claim 11, wherein the bottom wall of the frame is arranged at an angle relative to the upper rim, and wherein the deck panel is substantially parallel to the bottom wall in the lowered position.

13. The vehicle access ramp of claim 11, further comprising a drive mechanism coupled to the frame and configured to move the deck panel between the raised and lowered positions, wherein the drive mechanism includes a drive unit, an axle coupled to the drive unit for rotation by the drive unit, and a lifter coupled to the axle for rotation with the axle, and wherein the lifter engages the deck panel with rotation of the axle to move the deck panel between the raised and lowered positions.

14. The vehicle access ramp of claim 13, wherein the lifters are positioned between the bottom wall of the frame and the deck panel, wherein the lifter is arranged substantially perpendicular to the deck panel in the raised position, and wherein the lifter is arranged substantially parallel to the deck panel in the lowered position.

15. The vehicle access ramp of claim 14, further comprising rollers coupled to the lifters, wherein the rollers are configured to engage and slide along the deck panel with movement of the deck panel between the raised and lowered positions.

16. The vehicle access ramp of claim 11, wherein the fold-out section includes a first ramp portion coupled to the frame and a second ramp portion coupled to the first ramp portion, wherein the first ramp portion is configured to pivot relative to the frame, wherein the second ramp portion is configured to pivot relative to the first ramp portion, and wherein the second ramp portion extends from the first ramp portion and is aligned with the first ramp portion with the fold-out section in the use position.

* * * * *